US009432948B2

(12) United States Patent
Milotta et al.

(10) Patent No.: US 9,432,948 B2
(45) Date of Patent: Aug. 30, 2016

(54) AUTOMATIC TRANSMIT POWER CONTROL IN XPIC CONFIGURATION FOR WIRELESS APPLICATIONS

(75) Inventors: Giovanni Milotta, Busto Arsizio (IT); Antonio Carugati, Lissone (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/357,737

(22) PCT Filed: Dec. 22, 2011

(86) PCT No.: PCT/EP2011/073844
§ 371 (c)(1),
(2), (4) Date: May 12, 2014

(87) PCT Pub. No.: WO2013/091713
PCT Pub. Date: Jun. 27, 2013

(65) Prior Publication Data
US 2014/0323174 A1 Oct. 30, 2014

(51) Int. Cl.
*H04W 52/16* (2009.01)
*H04B 7/10* (2006.01)
*H04W 52/42* (2009.01)

(52) U.S. Cl.
CPC ............... *H04W 52/16* (2013.01); *H04B 7/10* (2013.01); *H04W 52/42* (2013.01)

(58) Field of Classification Search
CPC ....... H04B 7/10; H04W 52/42; H04W 52/16
See application file for complete search history.

(56) References Cited

U.S. PATENT DOCUMENTS 7,613,260 B2 * 11/2009 Eliaz ................. H04L 25/03057
375/349

FOREIGN PATENT DOCUMENTS

| EP | 1 494 380 A1 | 1/2005 | |
| EP | 1494380 | * 1/2005 | ............. H04J 11/00 |
| EP | 1 517 455 A1 | 3/2005 | |
| EP | 1517455 | * 3/2005 | ............. H04B 7/005 |
| GB | 2 262 016 A | 6/1993 | |
| GB | 2262016 | * 6/1993 | ............. H04B 7/005 |

* cited by examiner

*Primary Examiner* — Fanghwa Wang
(74) *Attorney, Agent, or Firm* — Rothwell, Figg, Ernst & Manbeck, P.C.

(57) ABSTRACT

A method of automatic transmit power control in a radio communication system employing a co-channel dual-polarized radio link between a first radio station and a second radio station. The method comprises receiving a horizontal polarized signal and a vertical polarized signal transmitted from the second radio station to the first radio station and in the first radio station estimating a received power level value from said received horizontal polarized signal, and a received power level value from said received vertical polarized signal. Determined power corrections values are transmitted to the second radio station during a transmission of the first radio station to adjust the transmit power of the second radio station. The determining of said transmit power correction values are independently determined from said estimated received power level values, a target power value, a cross polarization interference threshold level value, and said cross polarization interference level values.

12 Claims, 4 Drawing Sheets

AUTOMATIC TRANSMIT POWER CONTROL IN XPIC CONFIGURATION FOR WIRELESS APPLICATIONS

CROSS REFERENCE TO RELATED APPLICATION(S)

This application is a 35 U.S.C. §371 National Phase Entry Application from PCT/EP2011/073844, filed Dec. 22, 2011, designating the United States, the disclosure of which is incorporated herein its entirety by reference.

TECHNICAL FIELD

The invention relates in general to an automatic transmit power control method and system for radio equipment, and more particularly to an automatic transmit power control method and system for radio equipment of a cross polarization interference canceller system.

BACKGROUND

Today, more than ever, wireless network operators are looking for ways to increase the efficiency, traffic capability and robustness of their radio communication systems. A well-known way of providing efficiency, in terms of capacity per Hertz of bandwidth used, is to employ co-channel dual polarization (CCDP) operation in the radio link. CCDP operation provides two parallel communication channels with orthogonal polarized signals (i.e. one vertically polarized signal and one horizontally polarized signal) over the same channel, and thus doubling the capacity of the radio link. However, despite the orthogonality of the signals some interference between them, also known as cross polarization interference, almost inevitably occurs, due to for example imperfect antenna isolation and channel degradation. The cross polarization interference may seriously degrade the performance of the radio link.

A well-known technique to mitigate the effects of the cross polarization interference between the signals is to use a cross polarization interference cancelation (XPIC) system, wherein two separate receiver modems, one for each polarization, processes and combines the signals coming from the two receiving paths to cancel-out the cross polar interference and recover the original independent signals.

In addition to the cross polarization interference between signals a radio link may suffer from other degrading factors such as high transmission loss due to, for instance, multipath fading or flat fading that could deteriorate the quality of the channel. Automatic transmit power control (ATPC) is a common technique utilized in microwave radio links to control the transmitter power in relationship to the strength of the received signal to mitigate transmission losses in the radio link. In general, the ATPC performs an adjustment of the transmit radio power in order to maintain constant receive signal level by detecting a drop in the received signal level and transmit information about the drop to the transmit side, via a radio service channel, to provide for an adjustment of the transmit power. In this way the reliability may be increased in term of minimum time of outage of the radio link due to loss of signal.

Thus, by implementing an ATPC control loop in a radio link employing XPIC will allow for an increase in both capability of the radio link as well as an increase of the reliability. However, assume that the two independently ATPC loops are working and that one of the two orthogonality polarized signals, for instance the vertical polarized signal, is affected by fading. This will result in a drop in the vertically polarized signal and, consequently, the related ATPC loop performs an increase of the transmit power only on the vertical antenna. Since the transmit power of the horizontal polarized signal remains constant, then a rise of the transmit power of the vertical polarized signal will result in an increasing in interference, i.e. the cross polarization interference (XPI), from the vertical polarized signal on horizontal polarized signal degrading the performance of the radio link. Thus the radio link is in this way not robust against asymmetrical fading.

Although limited to counteract only Rayleigh fading, NEC Corp. (in their U.S. Pat. No. 5,392,459) gives a partial solution to the problem of handling asymmetrical fading. The concept adopted by NEC Corp. is to use a single ATPC control for both polarized signals instead of two independent for the two orthogonal channels. The transmit powers of the polarized signals are simultaneously increased when a drop of the receive signal level of at least one of the two polarized signals is detected. However, the equal increase of both the horizontally and the vertically polarized signals for preventing cross polar interference due to the selective fading, generates as a consequence an unnecessary overpower of the channels not affected by the fading, which may degrade the radio link.

Thus, finding a way to realize an ATPC loop in an XPIC microwave radio link which allows for an increased tolerance against cross polarization interference and at the same time is capable of handling imbalances between the two polarized signals is therefore highly sought after.

SUMMARY OF THE INVENTION

With the above description in mind, then, an aspect of the present invention is to provide a way to allow for ATPC in a radio link system in XPIC configuration that will mitigate, alleviate, or eliminate one or more of the above-identified deficiencies in the art and disadvantages singly or in any combination.

A first aspect of the present invention relates to a method of automatic transmit power control in a radio communication system employing a co-channel dual-polarized radio link between a first radio station and a second radio station, the method comprising receiving a horizontal polarized signal and a vertical polarized signal transmitted from said second radio station to said first radio station, and in said first radio station estimating a received power level value, $P_{Rx}^{H}$, from said received horizontal polarized signal, and a received power level value, $P_{Rx}^{V}$, from said received vertical polarized signal, determining a cross polarization interference level value, $XPI^{H}$, from said received horizontal polarized signal, and a cross polarization interference level value, $XPI^{V}$, from said received vertical polarized signal, determining power corrections values $\Delta P_{Tx}^{H}$ and $\Delta P_{Tx}^{V}$, transmitting said determined power corrections values to said second radio station using a service channel, adjusting transmit power of said second radio station based on received said power corrections values characterized in that said determining of said power correction values are independently determined from said estimated received power level values and a target power value, $PW_{TG}$, under a condition that said power correction values do not exceed a cross polarization interference threshold level value, $XPI_{TH}$, wherein said cross polarization interference threshold level value based on said cross polarization interference level values and said power corrections values. With this method the XPI levels of each polarized signals doesn't exceed the predetermined values and the system automatically and without any relationship between the two polarizations, reach the optimum condition in term of received power by adapting the power transmitted to compensate any propagation fading which each polarization is affected. This approach thus avoid overpower conditions in the radio link, allowing to impact positively on operation costs of the site, for instance the power savings and an increase in the mean time between failures of the equipment (especially in the transmit power amplifier chain).

The method wherein said received power level value $P_{Rx}^H$ may be estimated by a radio signal strength indicator detector in a receiver radio adapted for receiving said received horizontal polarized signal, and said received power level value $P_{Rx}^V$ may be estimated by a radio signal strength indicator in a receiver radio adapted for receiving said received vertical polarized signal.

The method wherein said cross polarization interference level value $XPI^H$ and said cross polarization interference level value $XPI^V$ may be calculated according to $$XPI^H = 10 \cdot \mathrm{LOG}\left(\frac{P(w_{Rx}(H \to H))}{P(w_{Rx}(V \to H))}\right)$$

$$XPI^V = 10 \cdot \mathrm{LOG}\left(\frac{P(w_{Rx}(V \to V))}{P(w_{Rx}(H \to V))}\right),$$

wherein $P(w_{Rx}(H \to H))$ is the power of said horizontal polarized signal transmitted on the horizontal polarization and received on the horizontal polarization, $P(w_{Rx}(H \to V))$ is the power of said horizontal polarized signal transmitted on the horizontal polarization and received on the vertical polarization, $P(w_{Rx}(V \to H))$ is the power of said vertical polarized signal transmitted on the vertical polarization and received on the horizontal polarization, and $P(w_{Rx}(V \to V))$ is the power of said vertical polarized signal transmitted on the vertical polarization and received on the vertical polarization.

The method wherein said power corrections values $\Delta P_{Tx}^H$ and $\Delta P_{Tx}^V$ may be independently calculated according to:

$$\begin{cases} \Delta P_{Tx}^H = PW_{TG} - P_{Rx}^H \\ \Delta P_{Tx}^V = PW_{TG} - P_{Rx}^V \end{cases}$$

if $XPI_{TH} \leq XPI^H + \Delta P_{Tx}^H - \Delta P_{Tx}^V$ and $XPI_{TH} \leq XPI^V + \Delta P_{Tx}^V - \Delta P_{Tx}^H,$ $$\begin{cases} \Delta P_{Tx}^H = PW_{TG} - P_{Rx}^H \\ \Delta P_{Tx}^V = \max((PW_{TG} - P_{Rx}^H); (PW_{TG} - P_{Rx}^V)) - XPI^V + XPI_{TH} \end{cases}$$

if $XPI_{TH} \leq XPI^H + \Delta P_{Tx}^H - \Delta P_{Tx}^V$ and $XPI_{TH} > XPI^V + \Delta P_{Tx}^V - \Delta P_{Tx}^H,$ $$\begin{cases} \Delta P_{Tx}^H = \max((PW_{TG} - P_{Rx}^H); (PW_{TG} - P_{Rx}^V)) - XPI^H + XPI_{TH} \\ \Delta P_{Tx}^V = PW_{TG} - P_{Rx}^V \end{cases}$$

if $XPI_{TH} > XPI^H + \Delta P_{Tx}^H - \Delta P_{Tx}^V$ and $XPI_{TH} \leq XPI^V + \Delta P_{Tx}^V - \Delta P_{Tx}^H,$ and $$\begin{cases} \Delta P_{Tx}^H = \max((PW_{TG} - P_{Rx}^H); (PW_{TG} - P_{Rx}^V)) \\ \Delta P_{Tx}^V = \max((PW_{TG} - P_{Rx}^H); (PW_{TG} - P_{Rx}^V)) \end{cases}$$

if $XPI_{TH} > XPI^H + \Delta P_{Tx}^H - \Delta P_{Tx}^V$ and $XPI_{TH} > XPI^V + \Delta P_{Tx}^V - \Delta P_{Tx}^H.$ In this way the two radio transmitters in the transmitter will be individually adjusted depending on the current status of the two received polarized signals at the two receivers, and thus avoiding any channel to be overpowered.

The method wherein said radio communication system may be a microwave radio link system employing quadrature amplitude modulation in a cross polarization interference cancellation configuration.

A second aspect of the present invention relates to a system for automatic transmit power control in a radio communication system employing a co-channel dual-polarized radio link between a first radio station and a second radio station, the system comprising a first radio receiver adapted for receiving a horizontal polarized signal transmitted from said second radio station to said first radio station, a second radio receiver for receiving a vertical polarized signal transmitted from said second radio station to said first radio station, an estimating unit in said first radio receiver adapted to estimate a received power level value, $P_{Rx}^H$, from said received horizontal polarized signal, an estimating unit in said second radio receiver adapted to estimate a received power level value, $P_{Rx}^V$, from said received vertical polarized signal, a horizontal modem adapted to determine a cross polarization interference level value, $XPI^H$, from said received horizontal polarized signal supplied by said first radio receiver, a vertical modem adapted to determine a cross polarization interference level value, $XPI^V$, from said received vertical polarized signal supplied by said second radio receiver, a digital control block, in said horizontal modem, adapted to determine a power corrections value $\Delta P_{Tx}^H$, a digital control block, in said vertical modem, adapted to determine a power corrections value $\Delta P_{Tx}^V$, wherein said first radio receiver is further adapted to transmit said determined power correction value $\Delta P_{Tx}^H$ to said second radio station via a service channel, and wherein said second radio receiver is further adapted to transmit said determined power correction value $\Delta P_{Tx}^V$ to said second radio station via a service channel, a first radio receiver in said second radio station adapted to receive said receive power correction value $\Delta P_{Tx}^H$, a horizontal modem in said second radio station adapted to adjust a transmit power of said first radio receiver in said second radio station based on said received said power corrections value $\Delta P_{Tx}^H$, a second receiver in said second radio station adapted to receive said receive power correction value $\Delta P_{Tx}^V$, a vertical modem in said second radio station adapted to adjust said transmit power of said second radio receiver in said second radio station based on said received said power corrections value $\Delta P_{Tx}^V$ characterized in that said power correction values are independently determined from said estimated received power level values and a target power value, $PW_{TG}$, under a condition that said power correction values do not exceed a cross polarization interference threshold level value, $XPI_{TH}$, wherein said cross polarization interference threshold level value based on said cross polarization interference level values and said power corrections values.

The system may further comprise a first radio signal strength indicator detector unit, located in said first radio receiver, adapted to estimate said received power level value $P_{Rx}^H$ and a second radio signal strength indicator detector unit, located in said second radio receiver, adapted to estimate said received power level value $P_{Rx}^V$.

The system according wherein said cross polarization interference level value $XPI_H$ may be calculated in said horizontal modem according to $$XPI^H = 10 \cdot \text{LOG}\left(\frac{P(w_{Rx}(H \to H))}{P(w_{Rx}(V \to H))}\right);$$

and wherein said cross polarization interference level value $XPI^V$ may be calculated in said vertical modem according to $$XPI^V = 10 \cdot \text{LOG}\left(\frac{P(w_{Rx}(V \to V))}{P(w_{Rx}(H \to V))}\right);$$

wherein $P(w_{Rx}(H \to H))$ is the power of said horizontal polarized signal transmitted on the horizontal polarization and received on the horizontal polarization in said first radio receiver, $P(w_{Rx}(H \to V))$ is the power of said horizontal polarized signal transmitted on the horizontal polarization and received on the vertical polarization said second radio receiver, $P(w_{Rx}(V \to H))$ is the power of said vertical polarized signal transmitted on the vertical polarization and received on the horizontal polarization said first radio receiver, and $P(w_{Rx}(V \to V))$ is the power of said vertical polarized signal transmitted on the vertical polarization and received on the vertical polarization said second radio receiver.

The system wherein said power corrections values $\Delta P_{Tx}^H$ and $\Delta P_{Tx}^V$ may be independently calculated according to $$\begin{cases} \Delta P_{Tx}^H = PW_{TG} - P_{Rx}^H \\ \Delta P_{Tx}^V = PW_{TG} - P_{Rx}^V \end{cases}$$

if $XPI_{TH} \le XPI^H + \Delta P_{Tx}^H - \Delta P_{Tx}^V$ and $XPI_{TH} \le XPI^V + \Delta P_{Tx}^V - \Delta P_{Tx}^H,$ $$\begin{cases} \Delta P_{Tx}^H = PW_{TG} - P_{Rx}^H \\ \Delta P_{Tx}^V = \max((PW_{TG} - P_{Rx}^H); (PW_{TG} - P_{Rx}^V)) - XPI^V + XPI_{TH} \end{cases}$$

if $XPI_{TH} \le XPI^H + \Delta P_{Tx}^H - \Delta P_{Tx}^V$ and $XPI_{TH} > XPI^V + \Delta P_{Tx}^V - \Delta P_{Tx}^H,$ $$\begin{cases} \Delta P_{Tx}^H = \max((PW_{TG} - P_{Rx}^H); (PW_{TG} - P_{Rx}^V)) - XPI^H + XPI_{TH} \\ \Delta P_{Tx}^V = PW_{TG} - P_{Rx}^V \end{cases}$$

if $XPI_{TH} > XPI^H + \Delta P_{Tx}^H - \Delta P_{Tx}^V$ and $XPI_{TH} \le XPI^V + \Delta P_{Tx}^V - \Delta P_{Tx}^H,$ and $$\begin{cases} \Delta P_{Tx}^H = \max((PW_{TG} - P_{Rx}^H); (PW_{TG} - P_{Rx}^V)) \\ \Delta P_{Tx}^V = \max((PW_{TG} - P_{Rx}^H); (PW_{TG} - P_{Rx}^V)) \end{cases}$$

if $XPI_{TH} > XPI^H + \Delta P_{Tx}^H - \Delta P_{Tx}^V$ and $XPI_{TH} > XPI^V + \Delta P_{Tx}^V - \Delta P_{Tx}^H,$ wherein said power corrections value $\Delta P_{Tx}^H$ is calculated in said horizontal modem and said power corrections value $\Delta P_{Tx}^V$ is calculated in said vertical modem.

The system wherein said radio communication system may be a microwave radio link system employing quadrature amplitude modulation in a cross polarization interference cancellation configuration.

The variations within each aspect disclosed above may be combined in any way possible to form different embodiments of the present invention.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout the application.

Embodiments of the present invention will be exemplified using a microwave radio link based on QAM modulation in XPIC configuration employing ATPC. However, it should be appreciated that the invention is as such equally applicable to other type of radio communication systems employing a XPIC technique.

As discussed above in the background section, microwave radio signals can be transmitted with orthogonal polarizations on the same communication channel (also known as co-channel dual-polarization) meaning that one signal is transmitted with a vertical polarization and the other signal is transmitted with a horizontal polarization on the same communication channel. Thus having a radio link employing co-channel dual-polarization communications will effectively double the capacity of the radio communication system.

However, despite the orthogonality of the polarized signals, some interference (or polarization leakage) between the signals almost always occurs due to factors such as imperfect antenna isolation and channel degradation (for example the depolarization effect that comes with rain and snow). A common way to mitigate the effect of the interference is to employ a cross polarization interference canceller (XPIC) in the radio communication system.

Figure 1:
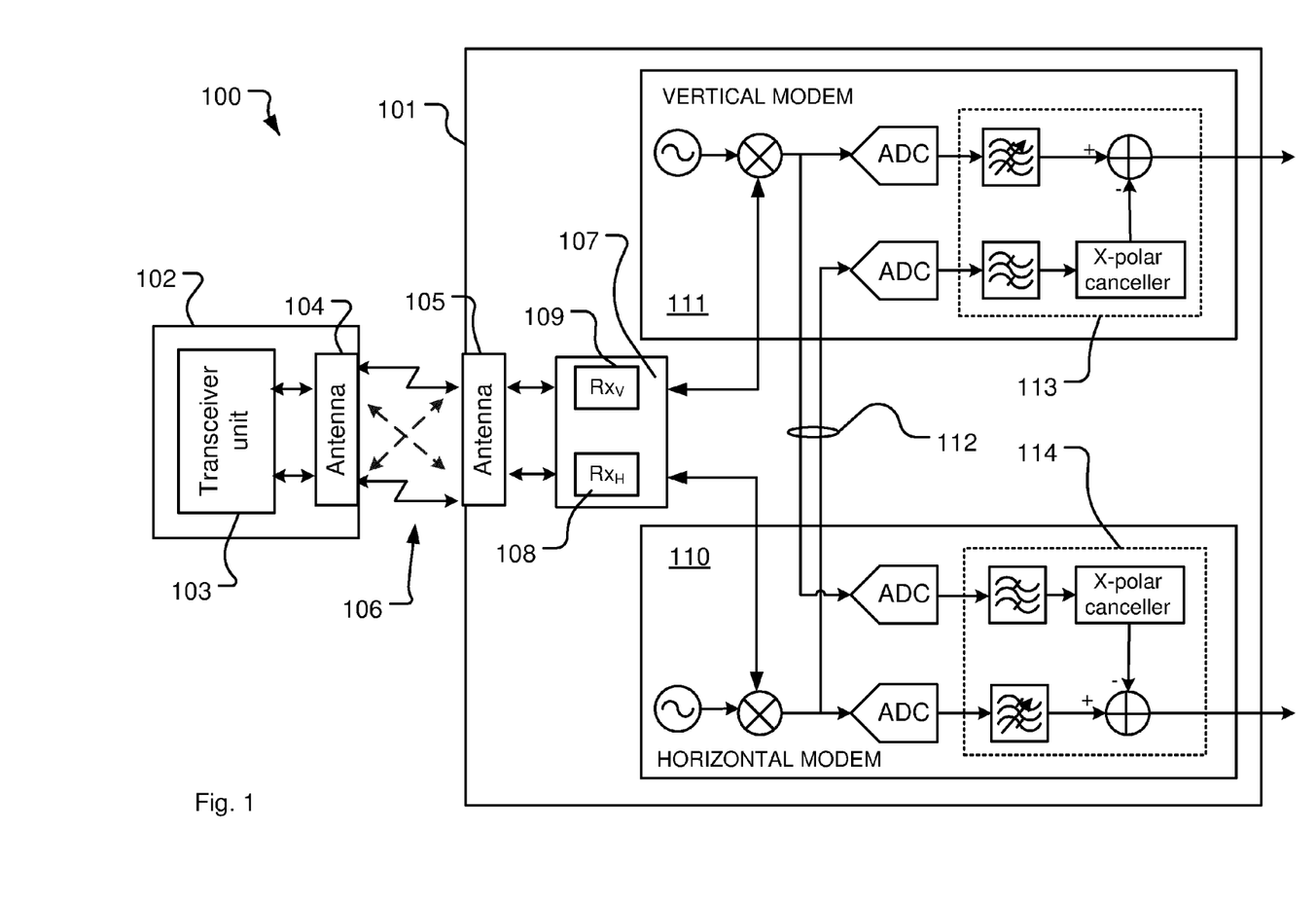
FIG. 1 shows a block diagram of a typical microwave XPIC link.

FIG. 1 shows a block diagram of a typical single input-single output (SISO) radio communication system 100 employing co-channel dual-polarized radio link in an XPIC configuration according to prior art. The radio communication system 100 comprise of a first radio station 101, a second radio station 102 and a communication channel 106 over which the first radio station 101 and the second radio station 102 communicate with each other. The examples of radio communication systems presented in the following description will proceed from that the second radio station 102 is transmitting signals, and thus being the transmitting end of the radio communication system 100, and that the first radio station 101 is receiving signals transmitted from the second radio station 102, thus being the receiving end of the communication system 100. However, a person skilled in the art understands that in reality both the first radio station 101 and the second radio station 102 is capable of transmitting and receiving signals over the communication channel 106. It should also be understood that the first radio station 101 and the second radio station 102 are the same in every aspect and capable of performing the same functions. However, in the description below mainly the functionality of the first radio station will, for simplicity, be discussed. The present invention mainly target the modem and transceiver parts of the radio communication system 100, and the description of the embodiments of the present invention will therefore also be limited to these parts. However it is clear to a person skilled in the arts that the radio communication system 100 in its entire is comprised of additional blocks not mentioned in the description.

The second radio station 102 in FIG. 1 is for simplicity reasons depicted to only comprise a transceiver unit 103 and a cross-polarization antenna 104. However, as mentioned above the second radio station 102 comprise the same basic parts as the first radio station 101, i.e. the transceiver unit 103 comprise two polarization branches wherein each polarization branch comprise a modem and a radio unit, one for handling the vertical polarized signals and one for handling horizontal polarized signals. The transceiver unit 103 is connected to a cross-polarization transmitter antenna 104 configured to transmit the polarized signals provided by the two polarization branches in the transceiver unit 103, on the same communication channel 106, to a cross-polarization antenna 105 in the first radio station 101.

The transmitted polarized signals are picked-up by the cross-polarization antenna 105 and processed individually and provided to a radio unit 107. The radio unit 107 comprises of a first radio receiver 108 and a second radio receiver 109 adapted for handling dual-polarized radio frequency signals. A horizontal polarized signal is received by said first radio receiver 108, in said radio unit 107, adapted for receiving and processing horizontal polarized signals, while a vertical polarized signal is received by a second radio receiver 109, in said radio unit 108, adapted for receiving and processing a vertical polarized signals. The received horizontal and vertical polarized signals by the cross-polarization antenna 105 are affected by interference between the signals as indicated by the dashed arrows in the communication channel 106.

The received horizontal polarized signal is supplied to a horizontal modem 110 adapted for processing the horizontal polarized signals. The received vertical polarized signal is supplied to a vertical modem 111 adapted for processing the vertical polarized signals. The modems 110,111 individually perform a demodulation function on respective signals, producing a horizontal demodulated base-band signal and a vertical demodulated base-band signal, respectively. To be able to perform a cross polarization interference cancellation (XPIC) 113,114 on the received horizontal and vertical polarized signals affected by interference, the demodulated base-band signals are exchanged 112 between the two modems 110,111. In the XPIC the cross-polar signal is subtracted from the polar signal and thereby cancels the cross-polarization interference. Thus, the XPIC combine the signals from the two receiving paths, the horizontal polarized signal path and the vertical polarized signal path, to recover the original independent signals transmitted from the second radio station 102. The XPIC may be carried out in a digital signal processor (DSP) 113, 114 in each modem. The resulting data stream from the XPIC, one for each polarization, is typically forwarded to a traffic manager block in the receiver chain. Further blocks in the receiver chain will not be discussed in this text since they are well known to a person skilled in the art of radio communications and since they are not directly affected by the present invention.

As discussed in the background section, a radio link such as the one presented in FIG. 1 may suffer from high transmission loss due to multipath fading or flat fading that could deteriorate the quality of the communication channel. An available remedy against fading issues is to use an automatic transmit power control (ATPC) system. ATPC is a common technique utilized in microwave radio links to control the transmitter power of the transmitter in relationship to the strength of the received signal at the receiver to be able to mitigate transmission losses in the radio link. In general, the ATPC performs an adjustment of the transmit power in the transmitter in order to maintain constant receive signal level in the receiver by detecting a drop in the received signal level and transmit power correction information to the transmit side, via a radio service channel, to provide for an adjustment of the transmit power.

Figure 2:
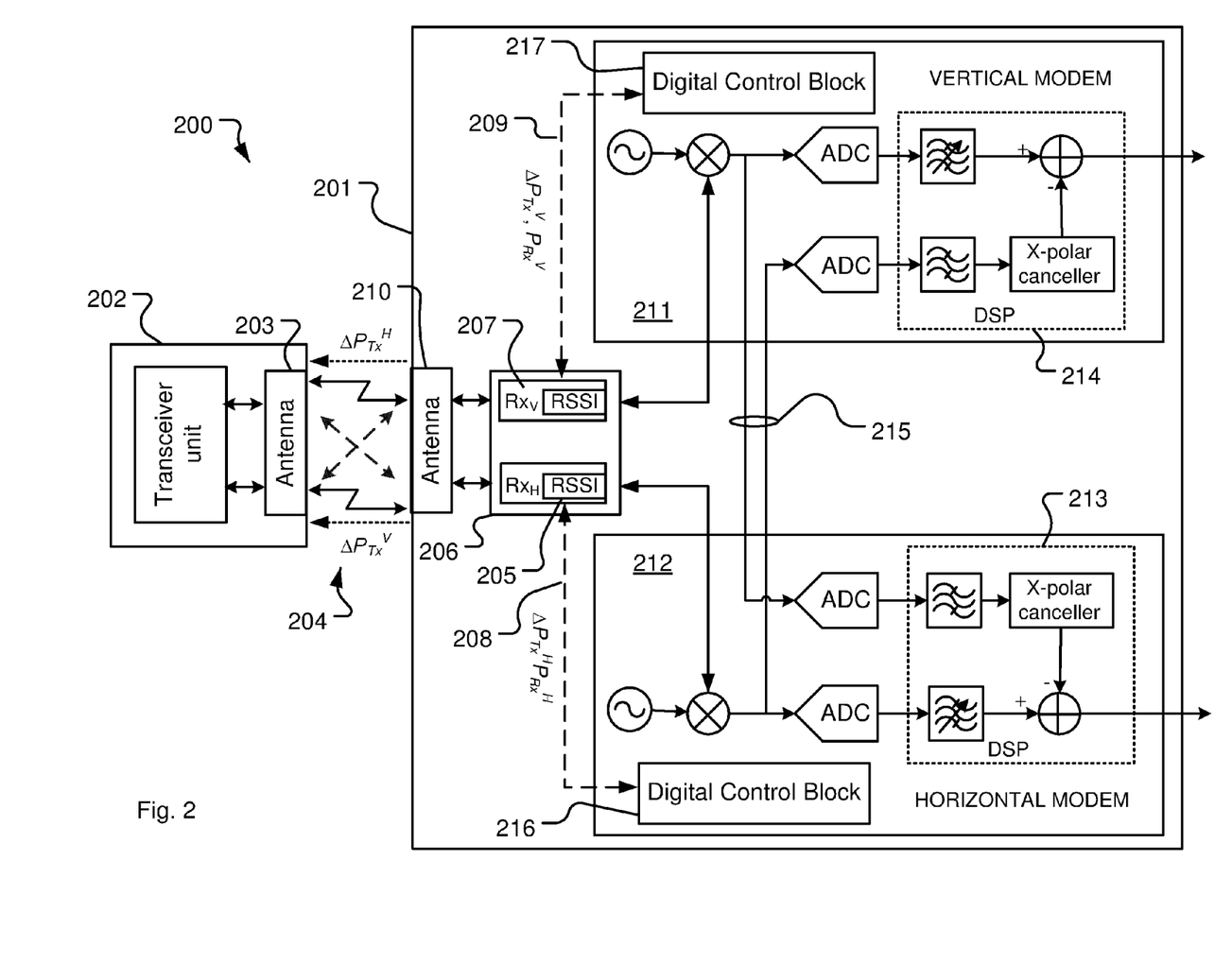
FIG. 2 shows a block diagram of a microwave XPIC link employing a standard single-input single-output (SISO) ATPC loop.

FIG. 2 shows a typical SISO radio communication system 200 employing co-channel dual-polarized radio link in an XPIC configuration wherein an ATPC loop has been implemented. As discussed in conjunction with FIG. 1 the second radio station 202 is in the same manner transmitting dual-polarized signals, a horizontal polarized signal and a vertical polarized signal via a cross-polarization transmitter antenna 203 over a communication channel 204 to a cross-polarization receiver antenna 210 in the first radio station 201. The received horizontal and vertical polarized signals by the cross-polarization antenna 210 are affected by interference between the signals as indicated by the dashed arrows in the communication channel 204. The received horizontal polarized signal and the received vertical polarized signal is supplied to a radio unit 206 comprising two radio receivers 205,207, wherein a first radio receiver 205 is adapted for receiving horizontal polarized signals and a second radio receiver 207 is adapted for receiving vertical polarized signals. The radio receivers 205,207 in the radio unit 206 each perform a frequency down conversion of the received signals to IF signals. The first radio receiver 205 and the second radio receiver 207 each comprise a radio signal strength indicator (RSSI) which is adapted to estimate the received power level value of the received polarized signal at the radio receiver. The polarized IF signals and the RSSI values, $P_{Rx}^{H}$ and $P_{Rx}^{V}$ (one for each polarisation branch) are respectively provided 208,209 to a corresponding modem 211,212. Thus, the horizontal polarized IF signal and the horizontal polarized RSSI value of $P_{Rx}^{H}$ are provided 208 to a horizontal modem 212, and the vertical polarized IF signal and the vertical polarized RSSI value of $P_{Rx}^{V}$ is provided 209 to a vertical modem 211. The modems 211,212 are configured to perform QAM demodulation of the polarized IF signals provided by the radio unit 206 and a cancellation of the residual interference by applying an XPIC 213,214. To be able to perform said XPIC in the modems 211,212, the demodulated base-band signals are exchanged 215 between the two modems 211,212 as described in conjunction with FIG. 1.

The RSSI values $P_{Rx}^{H}$ and $P_{Rx}^{V}$, estimated in the radio unit 206, are provided to a digital control block 216,217, in each modem 211,212 of the first radio station 201. The RSSI values $P_{Rx}^{H}$ and $P_{Rx}^{V}$ are in each digital control block 216,217 compared to a predetermined target power $PW_{TG}$, and transmit power correction values $\Delta P_{Tx}^{V}$ and $\Delta P_{Tx}^{H}$, one for each polarization, are determined. The transmit power correction values $\Delta P_{Tx}^{V}$ and $\Delta P_{Tx}^{H}$ are provided from said digital control blocks 216,217 to said radio unit 206 from where they are transmitted (marked as jagged arrows directed from the first radio station to the second radio station) by said cross-polarization transmitter antenna 210, via service channel, to the second radio station 201. The second radio station will receive the power correction values and adjust the gain of the transmitter accordingly. Thus, the two individual polarization branches in the radio communication system 200 will be simultaneously controlled to maintain constant transmit and receive signal level in the system.

However, a drawback with the ATPC loop is that it is vulnerable to selective fading. For example, assume that the two independent ATPC loops are working and that one of the two orthogonally polarized signals, for instance the vertical polarized signal, is affected by fading. This means that the signal strength of vertical polarization is dropped and, consequently, the related ATPC loop performs an increase of the transmit power only of the vertically polarized signal. However, since the transmit power of the horizontal polarized signal remains unchanged, then the rising of the transmit power of the vertical polarized signal will result in an increasing in interference from the vertical polarized signal on the horizontal polarized signal. Therefore this kind of ATPC loop approach is not optimal to use since there is an immediate risk of exceeding a maximum cross polarization interference (XPI) tolerated by the system, and consequently end up with a degradation of the radio link performance, especially in term of the time of no service. Thus, by applying the ATPC loop in the radio communication system 200 employing a co-channel dual-polarized radio link in an XPIC configuration will result in a system that is not robust and stable against asymmetrical fading.

Although only limited to counteract Rayleigh fading, the NEC Corp. (in their U.S. Pat. No. 5,392,459) gives a partial solution to the problem of handling asymmetrical fading. The concept adopted by NEC Corp. is to use a single ATPC control for both polarized signals. The transmit power of the polarized signals are simultaneously increased when a drop of the receive signal level of at least one of the two polarized signals is detected. However, the equal increase of both the horizontally and the vertically polarized signals for preventing cross polar interference due to the selective fading, generates as a consequence an unnecessary over-power of the channels not affected by the fading, which may degrade the radio link and consume unnecessary power. A typical example of this scenario is the fading due to rain, where the horizontal polarization suffers more the vertical polarization, both in term of attenuation and XPI.

As will be described below the proposed invention introduces a simple way to allow for an ATPC loop in a radio link system in XPIC configuration to be implemented without the drawbacks presented in prior art. The basic concept of the proposed invention is to take advantage of information coming from the XPIC of each modem, jointly with the RSSI values coming from said first radio receiver and said second radio receiver, to perform a control link from the receivers to the transmitters which controls the powers of each of the transmitters independently. The transmit power of each transmit radio is in this way simultaneously controlled in order, for instance, to increase when a drop in the received signal level of either receiver radios is detected and at the same time considering the XPI levels of the system. In this way the transmission power of each polarization branch is controlled independently of each other and simultaneously avoiding to exceed the maximum interference level permitted in the system.

Figure 3:
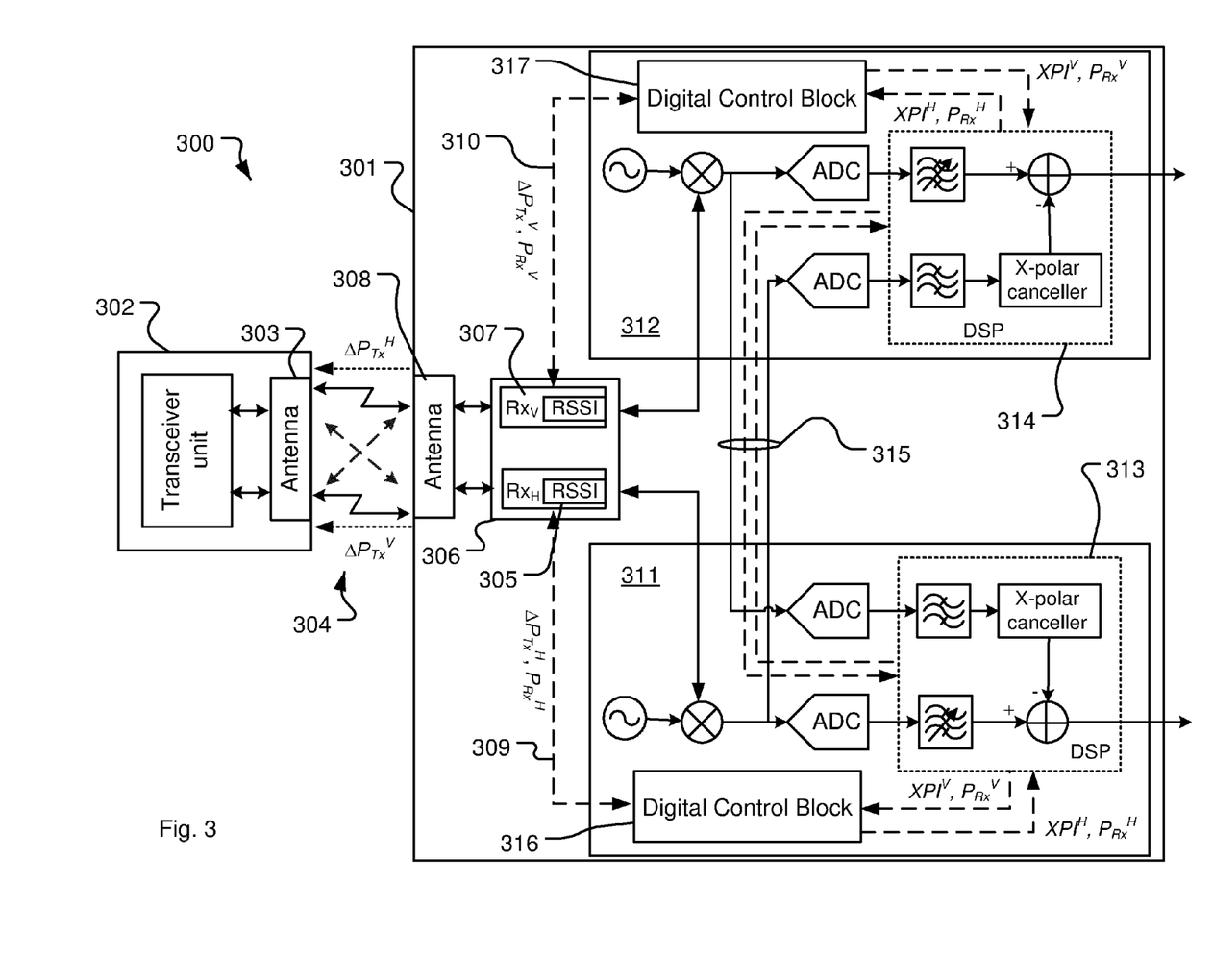
FIG. 3 shows a block diagram of a microwave XPIC link with a SISO ATPC loop according an embodiment of the present invention.

The ATPC solution in the present invention is fundamental based on the same setup as shown in FIG. 2. A block diagram of a SISO radio communication system 300 system for automatic transmit power control in a radio communication system employing a co-channel dual-polarized radio link between a first radio station and a second radio station according to an embodiment of the present invention is shown in FIG. 3. As discussed in conjunction with FIGS. 1 and 2 the second radio station 302 is in the same manner transmitting dual-polarized signals, a horizontal polarized signal and a vertical polarized signal via a cross-polarization transmitter antenna 303 over a communication channel 304 to a cross-polarization receiver antenna 305 in the first radio station 301. The received horizontal and vertical polarized signals by the cross-polarization antenna 308 are affected by interference between the signals as indicated by the dashed arrows in the communication channel 304. The received horizontal polarized signal and the received vertical polarized signal is supplied to a radio unit 306 comprising two radio receivers 305,307, wherein a first radio receiver 305 is adapted for receiving horizontal polarized signals and a second radio receiver 307 is adapted for receiving vertical polarized signals. The radio receivers 305,307 in the radio unit 306 each perform a frequency down conversion of the received polarized signals to IF signals. The first radio receiver 305 and the second radio receiver 307 each comprise a radio signal strength indicator (RSSI) which is adapted to estimate the received power level value of the received polarized signal at the radio receiver. The polarized IF signals and the RSSI values, $P_{Rx}^H$ and $P_{Rx}^V$ (one for each polarisation branch) are respectively provided 309,310 to a digital control block 316,317 in each of the modems 311, 312. Thus, the horizontal polarized IF signal and the horizontal polarized RSSI value of $P_{Rx}^H$ is provided 309 to a control block 316 in the horizontal modem 311, and the vertical polarized IF signal and the vertical polarized RSSI value of $P_{Rx}^V$ is provided 310 to a control block 317 in the vertical modem 312. The first radio receiver 305 and the second radio receiver 307 in the radio unit 306 continuously pass RSSI values to the control blocks 316,317 in the modems 311,312 during the operation of the radio communication system 300.

The modems 311,312 are configured to perform QAM demodulation of the polarized IF signals provided by the radio unit 306 and a cancellation of the residual interference by applying XPIC 313,314. To be able to perform said XPIC in the modems 311,312, the demodulated base-band signals are exchanged 315 (illustrated by the solid lines in the figure) between the two modems 311,312. In the XPIC the cross-polarized signal is as earlier described subtracted from the polarized signal and thereby cancels the cross-polarization interference in said signals. The XPIC may be performed in a DSP in said modems 311,312. The resulting data stream from the XPICs, one for each polarization, is typically forwarded to a traffic manager block in the receiver chain.

In order to simultaneously, but independently, control the transmit power of each transmit radio in the second radio station 302, via the digital control blocks 316,317 in the first radio station 301, and at the same time considering the XPI level for each polarization in the first radio station 301, the digital control blocks 316,317 need to have access to the current estimated RSSI values $P_{Rx}^H$ and $P_{Rx}^V$ and the current $XPI^H$ and $XPI^V$ values. The current RSSI values are provided by the RSSI in said first and second radio receivers 305,307 in the radio unit 306, while the current $XPI^H$ and $XPI^V$ values may be independently determined in the digital control blocks 316,317 according to, $$XPI^H = 10 \cdot \text{LOG}\left(\frac{P(w_{Rx}(H \to H))}{P(w_{Rx}(V \to H))}\right) \quad (1)$$

$$XPI^V = 10 \cdot \text{LOG}\left(\frac{P(w_{Rx}(V \to V))}{P(w_{Rx}(H \to V))}\right) \quad (2)$$

wherein $P(w_{Rx}(H \to H))$ is the power of said horizontal polarized signal transmitted on the horizontal polarization and received on the horizontal polarization, $P(w_{Rx}(H \to V))$ is the power of said horizontal polarized signal transmitted on the horizontal polarization and received on the vertical polarization, $P(w_{Rx}(V \to H))$ is the power of said vertical polarized signal transmitted on the vertical polarization and received on the horizontal polarization, and $P(w_{Rx}(V \to V))$ is the power of said vertical polarized signal transmitted on the vertical polarization and received on the vertical polarization, and wherein said $XPI^H$ and $XPI^V$ values in equation (1) and (2) are expressed in decibel (dB).

The determined current $XPI^H$ and $XPI^V$ values and the current estimated RSSI values $P_{Rx}^H$ and $P_{Rx}^V$ may be exchanged 315 in real-time between the DSPs in the modems 311,312 (shown by the jagged lines). One way of performing the real-time communication between the modems 311,312 has been disclosed in the International Patent Application no PCT/EP2009/053754 (30 Mar. 2009) with International Publication Number WO2010/112061 A1 entitled 'Communication between modem in XPIC configuration for wireless applications' by the same authors as in the present invention. By applying the method in the mentioned International Patent Application the digital control blocks 316,317 have real-time access to the $P_{Rx}^H$, $P_{Rx}^V$, $XPI^H$ and $XPI^V$ values which is needed to perform the ATPC disclosed in the present invention.

The basic concept of the ATPC disclosed in the embodiment of the present invention, is based on the concept that a maximum XPI level mustn't be exceeded for each polarization path when regulating the transmit power of the second radio station 302. In this way it is possible to guarantee that an optimal transmit power is reached maximizing the performance and the availability of the radio link in the radio communication system 300.

The transmit power correction values $\Delta P_{Tx}^V$ and $\Delta P_{Tx}^H$, one for each polarization, may be determined independently in said digital control blocks 316,316 according to $$\begin{cases} \Delta P_{Tx}^H = PW_{TG} - P_{Rx}^H \\ \Delta P_{Tx}^V = PW_{TG} - P_{Rx}^V \end{cases} \quad (3)$$

wherein $PW_{TG}$ is a predetermined target power defined in said digital control blocks 316,316. However, the power correction values for each polarization in equation (3) are determined under the constrain that none of the power correction values in (3) exceed a predetermined maximum XPI threshold level value ($XPI_{TH}$) admitted in the radio communication system 300. In this way the present invention may foresee if the determined power correction values that is going to be applied to the transmitters in the second radio station 302 could cause any of the $XPI^H$ and $XPI^V$ values to be exceeded. Thus, the determined power correction values for each polarization in equation (3) must satisfy both expressions in equation (4).

$$\begin{cases} XPI_{TH} \leq XPI^H + \Delta P_{Tx}^H - \Delta P_{Tx}^V \\ XPI_{TH} \leq XPI^V + \Delta P_{Tx}^V - \Delta P_{Tx}^H \end{cases} \quad (4)$$

If both expressions in equation (4) is satisfied (i.e. true) and the $XPI_{TH}$ value isn't exceeded for any of the polarization branches then the power correction values $\Delta P_{Tx}^V$ and $\Delta P_{Tx}^H$ according to (3) are provided from said digital control blocks 316,317 to said radio unit 306 from where they are transmitted (marked as jagged arrows directed from the first radio station to the second radio station) by said cross-polarization transmitter antenna 308, via a service channel, to the second radio station 301. However, if $XPI_{TH} \leq XPI^H + \Delta P_{Tx}^H - \Delta P_{Tx}^V$ and $XPI_{TH} > XPI^V + \Delta P_{Tx}^V - \Delta P_{Tx}^H$ then the $XPI^V$ value is lower than the $XPI_{TH}$ value. In this case the ATPC algorithm foresees that the transmit power in the vertical polarization branch need to be increased in order to optimize the degraded radio link. In this way an optimal trade-off between power level and the interference is obtained. In this case the vertical polarization branch must be adjusted, and the power correction values are to be determined according to (5).

$$\begin{cases} \Delta P_{Tx}^H = PW_{TG} - P_{Rx}^H \\ \Delta P_{Tx}^V = \max((PW_{TG} - P_{Rx}^H); (PW_{TG} - P_{Rx}^V)) - XPI^V + XPI_{TH} \end{cases} \quad (5)$$

If $XPI_{TH} > XPI^H + \Delta P_{Tx}^H - \Delta P_{Tx}^V$ and $XPI_{TH} \leq XPI^V + \Delta P_{Tx}^V - \Delta P_{Tx}^H$ then the $XPI^H$ value is lower than the $XPI_{TH}$ value. In this case the ATPC algorithm foresees that the transmit power in the horizontal polarization branch need to be increased in order to optimize the degraded radio link. In this way an optimal trade-off between power level and the interference is obtained. In this case the horizontal polarization branch must be adjusted, and the power correction values are to be determined according to (6).

$$\begin{cases} \Delta P_{Tx}^H = \max((PW_{TG} - P_{Rx}^H); (PW_{TG} - P_{Rx}^V)) - XPI^H + XPI_{TH} \\ \Delta P_{Tx}^V = PW_{TG} - P_{Rx}^V \end{cases} \quad (6)$$

If $XPI_{TH} > XPI^H + \Delta P_{Tx}^H - \Delta P_{Tx}^V$ and $XPI_{TH} > XPI^V + \Delta P_{Tx}^V - \Delta P_{Tx}^H$ then both the $XPI^H$ and the $XPI^V$ value are simultaneously lower than the $XPI_{TH}$ value. In this case the ATPC algorithm foresees that the transmit power in both polarization branches need to be increased by an equal amount in order to optimize the degraded radio link. In this way the XPI ratio are maintained constant but the robustness of the radio link is greatly approved. In this case the power correction values are to be determined according to (7).

$$\begin{cases} \Delta P_{Tx}^H = \max((PW_{TG} - P_{Rx}^H); (PW_{TG} - P_{Rx}^V)) \\ \Delta P_{Tx}^V = \max((PW_{TG} - P_{Rx}^H); (PW_{TG} - P_{Rx}^V)) \end{cases} \quad (7)$$

The determined power correction values $\Delta P_{Tx}^V$ and $\Delta P_{Tx}^H$ are then provided from said digital control blocks 316,317 to said radio unit 306 from where they are transmitted (marked as jagged arrows directed from the first radio station to the second radio station) by said cross-polarization transmitter antenna 308, via a service channel, to the second radio station 301.

Figure 4:
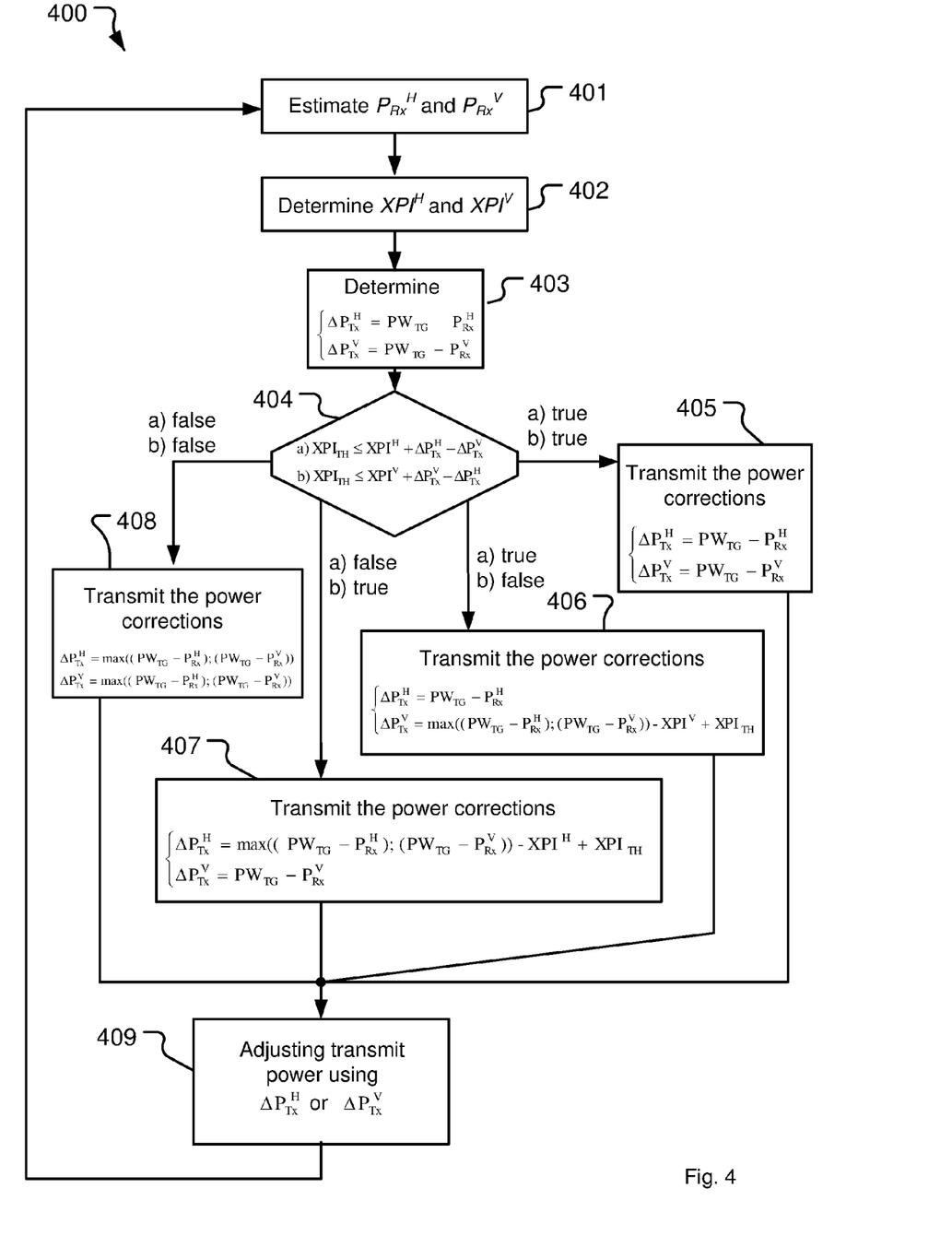
FIG. 4 shows a flowchart describing the ATPC loop for the microwave XPIC link, according to an embodiment of the present invention.

FIG. 4 shows a flowchart 400 describing the automatic transmit power control method applied in a radio communication system employing a co-channel dual-polarized radio link between a first radio station and a second radio station. When the first radio station receives a horizontal polarized signal and a vertical polarized signal transmitted from the second radio station to said first radio station, the following steps of the ATPC method are taken in said first radio station. The steps of the method entails:

- estimating 401 a received power level value, $P_{Rx}^H$, from said received horizontal polarized signal, and a received power level value, $P_{Rx}^V$, from said received vertical polarized signal;
- determining 402 a cross polarization interference level value, $XPI^H$, from said received horizontal polarized signal, and a cross polarization interference level value, $XPI^V$, from said received vertical polarized signal;
- determining 403 power corrections values $\Delta P_{Tx}^H$ and $\Delta P_{Tx}^V$, independently of each other from said estimated received power level values, a target power value, $PW_{TG}$, a cross polarization interference threshold level value, $XPI_{TH}$, and said cross polarization interference level values;
- transmitting 405,406,407,408 said determined power corrections values to said second radio station during a transmission of the first radio station; and
- adjusting 409 transmit power of said second radio station based on received said power corrections values.

It is important to notice that the ATPC method according to the embodiment of the present invention does not require advanced synchronization between the two digital control blocks 316,317 in the modems 312,311. For instance, the power corrections provided to the second radio station are smoothly applied to the power amplifiers within a constant time (usually within a few milliseconds) and the ATPC has a response time of few tens of milliseconds, while the computation time of the digital control blocks 316,317 together with the handshaking of the parameters between the modems 311,312 is completed within a refresh time that is significantly lower than the constant time it takes for a complete ATPC loop or any other synchronization.

If the XPI level of both the polarized signals doesn't exceed the $XPI_{TH}$ value, the ATPC system will automatically and without any dependency between the polarization branches reach the optimum condition in terms of received power (fixed receive target power), and it will also adapt the power transmitted to compensate for any propagation fading affecting one or both or the polarization branches. In this way an over-power condition for any of the polarization branches is avoided, which will have a positive impact on OPEX cost of the sites installation and maintenance (power saving), and it will also increase the mean time between failures of the equipment (especially in the transmit power amplifier chain).

However, if one of the XPI values of the polarization branches exceeds the $XPI_{TH}$ value, the ATPC system will adjust itself to reach an optimal condition which maximizes XPI values in relation to the $XPI_{TH}$ value, and thus achieve the target receiver power for the most penalized polarization branch. The ATPC system adjusts the individual polarization branches to counteract different 'fading behaviors' peculiar of each polarization branch. It reaches always the best allowable condition for both polarization branches without the risk of degrading the radio link performance due to the domination of a one of the polarization branches (excessive XPI level).

The ATPC system also shows its efficiency also in case where the radio link isn't working properly, due to for instance hardware fault or similar events, where both of the XPI values are less that the $XPI_{TH}$ value. In fact, if just one of the XPI values exceeds the limit the system will automatically adjust it self to the best trade-off between received power levels and the interference. In the situation where both XPI values are lower than the $XPI_{TH}$ value the radio link will reach an optimum in terms of robustness.

Thus the present invention as described in the embodiment above offers the best way to perform ATPC in an XPIC configuration which allows for minimizing the outage of the system and maximizing the performance of the radio communication system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method of automatic transmit power control in a radio communication system employing a co-channel dual-polarized radio link between a first radio station and a second radio station, the method comprising:
   receiving a horizontal polarized signal and a vertical polarized signal transmitted from said second radio station to said first radio station;
   in said first radio station:
   estimating a received power level value, $P_{Rx}^H$, from said received horizontal polarized signal, and a received power level value, $P_{Rx}^V$, from said received vertical polarized signal;
   determining a cross polarization interference level value, $XPI^H$, from said received horizontal polarized signal, and a cross polarization interference level value, $XPI^V$, from said received vertical polarized signal;
   determining power corrections values $\Delta P_{Tx}^H$ and $\Delta P_{Tx}^V$; and
   transmitting said determined power corrections values to said second radio station using a service channel for enabling adjustment of the transmit power of said second radio station based on received said power corrections values, wherein said determining of said power correction values are independently determined from said estimated received power level values and a target power value, $PW_{TG}$, under a condition that said power correction values do not exceed a cross polarization interference threshold level value, $XPI_{TH}$, such that $XPI_{TH} \leq XPI^H + \Delta P_{Tx}^H - \Delta P_{Tx}^V$ and $XPI_{TH} \leq XPI^V + \Delta P_{Tx}^V - \Delta P_{Tx}^H$, and wherein said cross polarization interference threshold level value is based on said cross polarization interference level values and said power corrections values.

2. The method according to claim 1, wherein said received power level value $P_{Rx}^H$ is estimated by a radio signal strength indicator detector in a first receiver radio adapted for receiving said received horizontal polarized signal, and said received power level value $P_{Rx}^V$ is estimated by a radio signal strength indicator detector in a second receiver radio adapted for receiving said received vertical polarized signal.

3. The method according to claim 1, wherein said cross polarization interference level value $XPI^H$ and said cross polarization interference level value $XPI^V$ are determined according to $$XPI^H = 10 \cdot \mathrm{LOG}\left(\frac{P(w_{Rx}(H \to H))}{P(w_{Rx}(V \to H))}\right)$$

$$XPI^V = 10 \cdot \mathrm{LOG}\left(\frac{P(w_{Rx}(V \to V))}{P(w_{Rx}(H \to V))}\right),$$

wherein $P(w_{Rx}(H \to H))$ is the power of said horizontal polarized signal transmitted on the horizontal polarization and received on the horizontal polarization, $P(w_{Rx}(H \to V))$ is the power of said horizontal polarized signal transmitted on the horizontal polarization and received on the vertical polarization, $P(w_{Rx}(V \to H))$ is the power of said vertical polarized signal transmitted on the vertical polarization and received on the horizontal polarization, and $P(w_{Rx}(V \to V))$ is the power of said vertical polarized signal transmitted on the vertical polarization and received on the vertical polarization.

4. The method according to claim 1, wherein said power corrections values $\Delta P_{Tx}^H$ and $\Delta P_{Tx}^V$ are independently determined according to:

$$\begin{cases} \Delta P_{Tx}^H = PW_{TG} - P_{Rx}^H \\ \Delta P_{Tx}^V = PW_{TG} - P_{Rx}^V \end{cases}$$

if $XPI_{TH} \leq XPI^H + \Delta P_{Tx}^H - \Delta P_{Tx}^V$ and $XPI_{TH} \leq XPI^V + \Delta P_{Tx}^V - \Delta P_{Tx}^H,$ $$\begin{cases} \Delta P_{Tx}^H = PW_{TG} - P_{Rx}^H \\ \Delta P_{Tx}^V = \max((PW_{TG} - P_{Rx}^H); (PW_{TG} - P_{Rx}^V)) - XPI^V + XPI_{TH} \end{cases}$$

if $XPI_{TH} \leq XPI^H + \Delta P_{Tx}^H - \Delta P_{Tx}^V$ and $XPI_{TH} > XPI^V + \Delta P_{Tx}^V - \Delta P_{Tx}^H,$ $$\begin{cases} \Delta P_{Tx}^H = \max((PW_{TG} - P_{Rx}^H); (PW_{TG} - P_{Rx}^V)) - XPI^H + XPI_{TH} \\ \Delta P_{Tx}^V = PW_{TG} - P_{Rx}^V \end{cases}$$

if $XPI_{TH} > XPI^H + \Delta P_{Tx}^H - \Delta P_{Tx}^V$ and $XPI_{TH} \leq XPI^V + \Delta P_{Tx}^V - \Delta P_{Tx}^H,$ and $$\begin{cases} \Delta P_{Tx}^H = \max((PW_{TG} - P_{Rx}^H); (PW_{TG} - P_{Rx}^V)) \\ \Delta P_{Tx}^V = \max((PW_{TG} - P_{Rx}^H); (PW_{TG} - P_{Rx}^V)) \end{cases}$$

if $XPI_{TH} > XPI^H + \Delta P_{Tx}^H - \Delta P_{Tx}^V$ and $XPI_{TH} > XPI^V + \Delta P_{Tx}^V - \Delta P_{Tx}^H.$ 5. The method according to claim 1, wherein said radio communication system is a microwave radio link system employing quadrature amplitude modulation in a cross polarization interference cancellation configuration.

6. A system for automatic transmit power control in a radio communication system employing a co-channel dual-polarized radio link between a first radio station and a second radio station, the system comprising:

a first radio receiver adapted for receiving a horizontal polarized signal transmitted from said second radio station to said first radio station;

a second radio receiver adapted for receiving a vertical polarized signal transmitted from said second radio station to said first radio station;

an estimating unit in said first radio receiver adapted to estimate a received power level value, $P_{Rx}^H$, from said received horizontal polarized signal;

an estimating unit in said second radio receiver adapted to estimate a received power level value, $P_{Rx}^V$, from said received vertical polarized signal;

a horizontal modem adapted to determine a cross polarization interference level value, $XPI^H$, from said received horizontal polarized signal supplied by said first radio receiver;

a vertical modem adapted to determine a cross polarization interference level value, $XPI^V$, from said received vertical polarized signal supplied by said second radio receiver;

a digital control block, in said horizontal modem, adapted to determine a power corrections value $\Delta P_{Tx}^H$;

a digital control block, in said vertical modem, adapted to determine a power corrections value $\Delta P_{Tx}^V$;

wherein said first radio receiver is further adapted to transmit said determined power correction value $\Delta P_{Tx}^H$ to said second radio station using a service channel, and wherein said second radio receiver is further adapted to transmit said determined power correction value $\Delta P_{Tx}^V$ to said second radio station using said service channel;

a first radio receiver in said second radio station adapted to receive said receive power correction value $\Delta P_{Tx}^H$;

a horizontal modem in said second radio station adapted to adjust a transmit power of said first radio receiver in said second radio station based on said received said power corrections value $\Delta P_{Tx}^H$ a second receiver in said second radio station adapted to receive said receive power correction value $\Delta P_{Tx}^V$; and a vertical modem in said second radio station adapted to adjust said power of said second radio receiver in said second radio station based on said received said power corrections value $\Delta P_{Tx}^V$, wherein said power correction values are independently determined from said estimated received power level values and a target power value, $PW_{TG}$, under a condition that said power correction values do not exceed a cross polarization interference threshold level value, $XPI_{TH}$, such that $XPI_{TH} \leq XPI^H + \Delta P_{Tx}^H - \Delta P_{Tx}^V$ and $XPI_{TH} \leq XPI^V + \Delta P_{Tx}^V - \Delta P_{Tx}^H$, and wherein said cross polarization interference threshold level value is based on said cross polarization interference level values and said power corrections values.

7. The system according to claim 6, further comprising:

a first radio signal strength indicator detector unit, located in said first radio receiver, adapted to estimate said received power level value $P_{Rx}^{H}$; and a second radio signal strength indicator detector unit, located in said second radio receiver, adapted to estimate said received power level value $P_{Rx}^{V}$.

8. The system according to claim 6, wherein said cross polarization interference level value $XPI^H$ is calculated in said horizontal modem according to $$XPI^H = 10 \cdot \text{LOG}\left(\frac{P(w_{Rx}(H \to H))}{P(w_{Rx}(V \to H))}\right);$$

and wherein said cross polarization interference level value $XPI^V$ is calculated in said vertical modem (312) according to $$XPI^V = 10 \cdot \text{LOG}\left(\frac{P(w_{Rx}(V \to V))}{P(w_{Rx}(H \to V))}\right);$$

and wherein $P(w_{Rx}(H \to H))$ is the power of said horizontal polarized signal transmitted on the horizontal polarization and received on the horizontal polarization in said first radio receiver, $P(w_{Rx}(H \to V))$ is the power of said horizontal polarized signal transmitted on the horizontal polarization and received on the vertical polarization said second radio receiver, $P(w_{Rx}(V \to H))$ is the power of said vertical polarized signal transmitted on the vertical polarization and received on the horizontal polarization said first radio receiver, and $P(w_{Rx}(V \to V))$ is the power of said vertical polarized signal transmitted on the vertical polarization and received on the vertical polarization said second radio receiver.

9. The system according to claim 6, wherein said power corrections values $\Delta P_{Tx}^{H}$ and $\Delta P_{Tx}^{V}$ are independently calculated according to:

$$\begin{cases} \Delta P_{Tx}^{H} = PW_{TG} - P_{Rx}^{H} \\ \Delta P_{Tx}^{V} = PW_{TG} - P_{Rx}^{V} \end{cases}$$

if $XPI_{TH} \leq XPI^H + \Delta P_{Tx}^{H} - \Delta P_{Tx}^{V}$ and $XPI_{TH} \leq XPI^V + \Delta P_{Tx}^{V} - \Delta P_{Tx}^{H}$, $$\begin{cases} \Delta P_{Tx}^{H} = PW_{TG} - P_{Rx}^{H} \\ \Delta P_{Tx}^{V} = \max((PW_{TG} - P_{Rx}^{H}); (PW_{TG} - P_{Rx}^{V})) - XPI^V + XPI_{TH} \end{cases}$$

if $XPI_{TH} \leq XPI^H + \Delta P_{Tx}^{H} - \Delta P_{Tx}^{V}$ and $XPI_{TH} > XPI^V + \Delta P_{Tx}^{V} - \Delta P_{Tx}^{H}$, $$\begin{cases} \Delta P_{Tx}^{H} = \max((PW_{TG} - P_{Rx}^{H}); (PW_{TG} - P_{Rx}^{V})) - XPI^H + XPI_{TH} \\ \Delta P_{Tx}^{V} = PW_{TG} - P_{Rx}^{V} \end{cases}$$

if $XPI_{TH} > XPI^H + \Delta P_{Tx}^{H} - \Delta P_{Tx}^{V}$ and $XPI_{TH} \leq XPI^V + \Delta P_{Tx}^{V} - \Delta P_{Tx}^{H}$, and $$\begin{cases} \Delta P_{Tx}^{H} = \max((PW_{TG} - P_{Rx}^{H}); (PW_{TG} - P_{Rx}^{V})) \\ \Delta P_{Tx}^{V} = \max((PW_{TG} - P_{Rx}^{H}); (PW_{TG} - P_{Rx}^{V})) \end{cases}$$

if $XPI_{TH} > XPI^H + \Delta P_{Tx}^{H} - \Delta P_{Tx}^{V}$ and $XPI_{TH} > XPI^V + \Delta P_{Tx}^{V} - \Delta P_{Tx}^{H}$ wherein said power corrections value $\Delta P_{Tx}^{H}$ is calculated in said horizontal modem and said power corrections value $\Delta P_{Tx}^{V}$ is calculated in said vertical modem.

10. The system according to claim 6, wherein said radio communication system is a microwave radio link system employing quadrature amplitude modulation in a cross polarization interference cancellation configuration.

11. The method according to claim 1, wherein said cross polarization interference level value $XPI^H$ is determined according to a log of the power of said horizontal polarized signal transmitted on the horizontal polarization and received on the horizontal polarization divided by the power of said vertical polarized signal transmitted on the vertical polarization and received on the horizontal polarization.

12. The method according to claim 1, wherein said cross polarization interference level value XPIV is determined according to a log of the power of said vertical polarized signal transmitted on the vertical polarization and received on the vertical polarization divided by the power of said horizontal polarized signal transmitted on the horizontal polarization and received on the vertical polarization.

* * * * *